United States Patent
Nayak et al.

(10) Patent No.: US 12,555,982 B2
(45) Date of Patent: Feb. 17, 2026

(54) SYSTEM AND METHOD FOR ENERGY MANAGEMENT OF A POWER DISTRIBUTION PANEL

(71) Applicant: Siemens Industry, Inc., Alpharetta, GA (US)

(72) Inventors: Amit Nayak, Atlanta, GA (US); Guang Yang, Johns Creek, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 252 days.

(21) Appl. No.: 18/362,562

(22) Filed: Jul. 31, 2023

(65) Prior Publication Data

US 2025/0047078 A1    Feb. 6, 2025

(51) Int. Cl.
*H02B 1/04* (2006.01)
*H04L 12/28* (2006.01)

(52) U.S. Cl.
CPC ........... *H02B 1/04* (2013.01); *H04L 12/2803* (2013.01)

(58) Field of Classification Search
CPC ............ H02B 1/04; H02B 1/056–0565; H04L 12/2803; H04L 12/2818; H02J 13/00004; H02J 13/00036
See application file for complete search history.

(56) References Cited

U.S. PATENT DOCUMENTS

| | | |
|---|---|---|
| 4,644,320 A | 2/1987 | Carr et al. |
| 6,956,500 B1 | 10/2005 | Ducharme et al. |
| 8,098,465 B1 * | 1/2012 | Flegel ................. H02H 1/0015 361/42 |
| 8,760,825 B2 | 6/2014 | Erger et al. |
| 9,172,623 B1 | 10/2015 | Micali et al. |
| 9,496,111 B1 * | 11/2016 | Titus ..................... H01H 71/08 |
| 9,595,825 B2 | 3/2017 | Curt |
| 9,614,690 B2 | 4/2017 | Ehsani et al. |
| 11,228,912 B2 | 1/2022 | Freeman et al. |
| 11,297,506 B2 | 4/2022 | Kevelos et al. |
| 11,606,695 B2 | 3/2023 | Ostrovsky et al. |
| 2009/0028184 A1 * | 1/2009 | Carpman ............. G05B 19/058 370/466 |
| 2010/0238003 A1 * | 9/2010 | Chan .................. H04L 12/2818 340/538 |
| 2012/0303554 A1 | 11/2012 | Osann |
| 2014/0088780 A1 * | 3/2014 | Chen ................. H02J 13/00004 700/295 |

(Continued)

FOREIGN PATENT DOCUMENTS

| | | |
|---|---|---|
| CN | 113993007 A | 1/2022 |
| EP | 2901231 B1 | 5/2020 |

OTHER PUBLICATIONS

U.S. Appl. No. 17/657,496, filed Mar. 31, 2022, Nayak et al.

*Primary Examiner* — Jacob R Crum

(57) ABSTRACT

There are systems and methods for energy management of a power distribution panel. Circuit breakers and an energy management gateway are located in the power distribution panel, and an internal panel communication network is established among the circuit breakers and the gateway. The gateway exchanges data of the circuit breakers and sends commands to control the circuit breakers. The gateway provides the data to an external device that is part of a network external to the internal panel communication network for controlling one or more appliances.

18 Claims, 5 Drawing Sheets

(56) References Cited

U.S. PATENT DOCUMENTS

| | | | |
|---|---|---|---|
| 2015/0185259 A1* | 7/2015 | Axelsson | G01R 21/133 |
| | | | 324/140 R |
| 2020/0259336 A1* | 8/2020 | Rao | B60L 53/60 |
| 2022/0303273 A1* | 9/2022 | Jaakkola | H04L 41/12 |
| 2023/0179015 A1 | 6/2023 | Rao et al. | |
| 2025/0038517 A1* | 1/2025 | Rao | H02J 13/0004 |

* cited by examiner

SYSTEM AND METHOD FOR ENERGY MANAGEMENT OF A POWER DISTRIBUTION PANEL

FIELD OF THE INVENTION

This application relates to the field of energy monitoring for power distribution panels of residential buildings and, more particularly, to communicating energy monitoring information between a residential power distribution panel and a smart home device.

BACKGROUND

Conventional power distribution panels of residential buildings are capable of collecting energy usage information of a particular building and providing the information to a remote system for analysis. Unfortunately, a home owner of the residential building has limited access to the energy usage information because the residential power distribution panel of the building does not provide the information to any of the owner's personal devices. Without access to the energy usage information, the personal devices of the owners lack the capability of providing a complete home energy management scenario for the residential buildings to the home owner.

A typical home owner may have a smart home hub and other smart home appliances to control home appliances, such as thermostats and lights, from a remote device, such as a smartphone. Smart home hubs rely on the user interface systems of the respective manufacturers. Separately, energy monitoring information is available from the user interface systems and applications developed by individual energy monitoring manufacturing companies. These two user interface systems are generally separate and independent of each other, and they do not provide any type of central access point to energy monitoring information for the home owner.

SUMMARY

In accordance with one embodiment of the disclosure, there is provided an energy monitoring approach for power distribution systems. The approach applies to the reporting of energy usage information from a power distribution panel of a residential facility to a smart home device. The approach allows for easy integration of the energy usage information with home automation information of the residential facility. The smart home device is a personal device operated by an owner and/or occupant of the residential facility that provides one or more home automation capabilities. For example, the smart home device may be a smart home hub that connects other smart home devices on a home automation network and manages communications among the devices. By having the energy monitoring information of the residential facility accessible by the smart home hub device, the home owner may have visualization and usability of the information through interoperable user interfaces instead of separate reporting systems, such as separate mobile applications for each devices.

One aspect is a system for energy management of a power distribution panel comprising multiple circuit breakers and an energy management gateway located in the power distribution panel. An internal panel communication network is located in the power distribution panel in which the internal panel communication network is established among the circuit breakers. The energy management gateway communicates with the circuit breakers, exchanges data of the circuit breakers, and sends commands to control the circuit breakers. The energy management gateway provides the data directly or indirectly to an external device. The external device is part of a network external to the internal panel communication network for controlling one or more appliances.

Another aspect is a method of the system for energy management of the power distribution panel. An internal panel communication network is established among the circuit breakers and an energy management gateway located in the power distribution panel. The energy management gateway communicates with the circuit breakers. Data of the circuit breakers is exchanged by the energy management gateway, and commands to control the circuit breakers are sent by the energy management gateway. The data is provided directly or indirectly to an external device by the energy management gateway. The external device is part of a network external to the internal panel communication network for controlling one or more appliances.

Yet another aspect is a system for energy management of a power distribution panel comprising a power distribution panel, an internal panel communication network located in the power distribution panel, and an energy management gateway of the internal panel communication network. The power distribution panel includes circuit breakers. The internal panel communication network is established among the circuit breakers. The energy management gateway is mounted at one or more slots of the power distribution panel. The energy management gateway communicates with the circuit breakers and exchanges data of the circuit breakers. The energy management gateway provides the data directly or indirectly to an external device, the external device being part of a network external to the internal panel communication network for controlling one or more appliances.

The above-described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
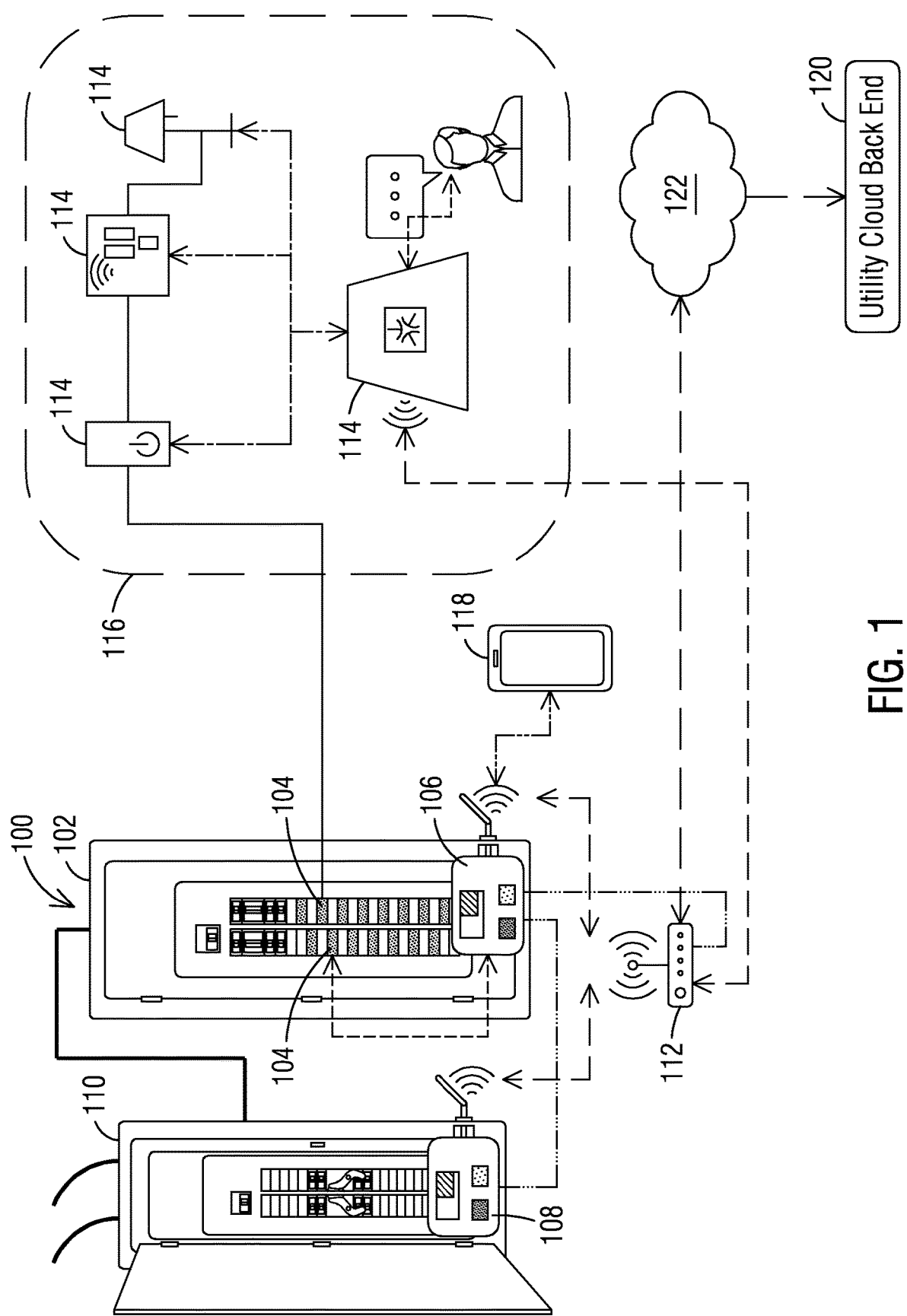
FIG. 1 depicts a system for energy management of the power distribution panel in an example implementation that is operable to employ the techniques described herein.

Various technologies that pertain to systems and methods that facilitate residential energy monitoring will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The system provides residential energy monitoring information accessible through external devices, such as smart home hubs and other smart home devices, to allow for a centrally located visualization, display, access for information that is related to the residential facility, i.e., home. The homeowner may prefer to be able to access the home relevant information in a single user interface instead of shifting between different applications hosted by different manufacturers. This kind of centralization is facilitated by communication-enabled electronic circuit breakers that are capable of disengaging the load but maintaining power to the communication module within the component by being powered on the line side. The solid-state circuit breaker with communication is able to provide the necessary fault protection to the branch and at the same time able to communicate to other devices through means of wireless communication.

The system 100 minimizes the need for additional upstream protection devices, such as a breaker or power regulator. The system 100 allows for components in the power distribution panel, such as an energy management gateway, to be mounted in one or more slots as an electronic (solid state) circuit breaker to save real estate for essential devices, facility integration, and minimize wiring requirements. Also, a user of the system may remotely activate/deactivate or turn on/off specific or multiple or identified "essential" branches in the residential power distribution panel by using voice-activated commands through an external device, such as a smart home device. The commands may be translated to the energy management gateway and through to the appropriate communication-enabled electronic circuit breakers. The external devices may use various inputs from several sources, including a power source selector, an energy management gateway, and other available sensors. In this manner, the external devices independently activate/deactivate or turn on/off specific or multiple or identified "essential" branches in the residential power distribution panel through the gateway and to the circuit breakers.

Referring to FIG. 1, there is shown a depiction of a system 100 for energy management of the power distribution panel in an example implementation that is operable to employ the techniques described herein. The system integrates products into a residential energy management gateway that may communicate through various protocols to other devices to facilitate access of data through an external device, such as a smart home hub, and its associated devices. The system 100 includes a power distribution panel 102, such as an integrated residential panel, which receives the power from either the utility/power provider directly or from another power source which can be selected by a system identified as power source selector 110.

The power distribution panel 102 includes one or more electronic or solid-state circuit breakers 104 and an energy management gateway 106. An internal panel communication network located in the power distribution panel 102 in which the internal panel communication network is established among the circuit breakers 104. The circuit breakers 104 may operate to interrupt current flow in response to overcurrent detection. The circuit breakers 104 and the energy management gateway 106 form the internal panel communication network located in the power distribution panel. The energy management gateway 106 communicates with the circuit breakers 104 and exchanges data of the circuit breakers. The energy management gateway 106 may receive load current consumption information from the circuit breakers 104 and determines power information of the power distribution panel 102.

For some embodiments, the energy management gateway 106 may receive information, such as second data, from an external source selector controller 108 of a power source selection panel 110 to identify the source of the power to the main residential panel and hence the household loads. Accordingly, the energy management gateway 106 may provide more analytics regarding the ability of the residential facility to be able to self-sustain in case of loss of utility grid power. For these embodiments, the system 100 may include the controller 108 to perform the activity of selecting a power source to the residential facility or allow a user to make an active choice based on the available sources. For example, a user may decide that solar coverage is significant and solar panels of the residential facility are able to generate sufficient power to energize essential loads in the facility. The user may be willing to also reduce her or his dependence on the power provider (such as, a Utility company) thereby reducing their periodic cost for power. As another example, for other complex installations, the controller 108 in this power source selection system may also monitor the source and load power conditions to sync the alternate sources so the user does not see any significant change to the energizing loads of the residential facility.

The controller 108 of power source selection panel 110 may communicate to external systems through wireless means or alternately through wired means. In one of the embodiments, the power source selector controller 108 may be wirelessly connected to a home network 112. Alternatively, the controller 108 may connect through wired means to a router of the home network 112 or to the energy management gateway 106. Through the wired or wireless means, the power source selector controller 108 may provide relevant information from the power source selection, such as a source of power. Examples of sources of power include, but are not limited to, a utility, a generator, or an inverter from battery or solar, and the like. The controller 108 may also provide power quality information such as harmonics, voltage sags or swells, etc. The second data may be transported by means of a standard protocol.

For some embodiments, the power source selector system may be a stand alone unit serving the purpose of providing power to the power distribution panel 102. For some embodiments, the power source selector system may be integrated within a larger system providing distributed power to individual branches.

Referring to the power distribution panel 102, each circuit breaker 104 may govern individual branches with a number of electrical wiring devices, such as switches or outlets or directly connected loads like lighting or fan loads. For some embodiments, electrical wiring devices may include, i.e., come preloaded with, a protocol. An example of the protocol includes, but is not limited to, Matter which is developed and run by the Connectivity Standards Alliance of Davis, California. Matter allow for ease of interoperability in between different manufacturers for the user interface, commissioning, and transfer of data capability. Protocols such as Matter may operate over other communication protocols, for example, Matter over Wifi.

The energy management gateway 106 provides data directly or indirectly to one or more external devices 114, such as external smart home devices. Each external device 114 is part of an external network 116, such as a smart home network, external to the internal panel communication network for controlling one or more external appliances. The external network 116 includes an external device, such as a smart home hub, as one of its appliances, and the internal panel communication network includes the circuit breakers 104 and the gateway 106.

In order for the energy management gateway 106 to be able to provide the home energy monitoring information to the external devices 114, the gateway has the protocol implemented (such as Matter). When invoked, one or more external devices 114 may recognize the energy management gateway 106 as a device of interest. Once the data of the energy management gateway 106 is accessible to an external device 114, one or more devices 114 of the external network 116 are able to provide the central point of access for visualization, display, command and control dashboard for the residential facility. For embodiments where a home network 112 is not available, the internal panel communication network of the power distribution panel 102 may communicate directly with an external device 118, such as a smartphone.

Communication technologies utilized by the components of the internal panel communication network for communication with the home network 112, external devices 114, external network 116, and external (non-home network) devices 118 may be wired, wireless, or both. The wireless technologies include, but are not limited to, Bluetooth (including BLE), ultrawide band (UWB). Wi-Fi (including Wi-Fi Direct), Zigbee, cellular, mesh networks, PAN, WPAN, WAN, near-field communications, and other types of radio communications and their variants.

The various benefits of this connectivity include, but are not limited to, visualization of the whole panel electrical power consumption (Watts) and/or individual branch electrical power consumption (Watts) by the home user at an external devices, such as a smart home device 114, recordation and visualization of the individual branch metering parameters (such as voltage, load current, power quality, etc.) as needed, and performing the individual branch remote control characteristics at the external device 114. For example, the user may decide to deactivate/remotely turn off a specific or multiple localized branches in the house through the external hub, thus identifying essential branches in the household by the user. As another example, the external device 114 may perform operations based on received input parameters such as schedules. Examples of schedules include, but are not limited to, home and vacation/ away schedules to turn on or turn off essential branches in the household. Another benefit is configuring a external device 114 to monitor the activation or deactivations of essential or non-essential branch loads and compare with the established schedules to provide notifications or alarms to the user to provide alerts in home safety situations. Further, the external devices 114 may be voice activated to provide additional assistance, such as providing the data information through audible means or perform notable actions. An example of a notable action includes, but is not limited to, remote control or active derating of the non essential branches to allow active load management of the household available power.

The internal panel communication network of the power distribution panel 102 may further communicate, i.e., exchange data, with remote services 120 such as a utility command center, a utility back end, or other remote devices associated with utility analytics and/or management. The internal panel communication network may communicate with the remote services 120 via a cloud infrastructure 122 that, in turn, communicates through the home network 112 or directly with the energy management gateway 106.

Figure 2:
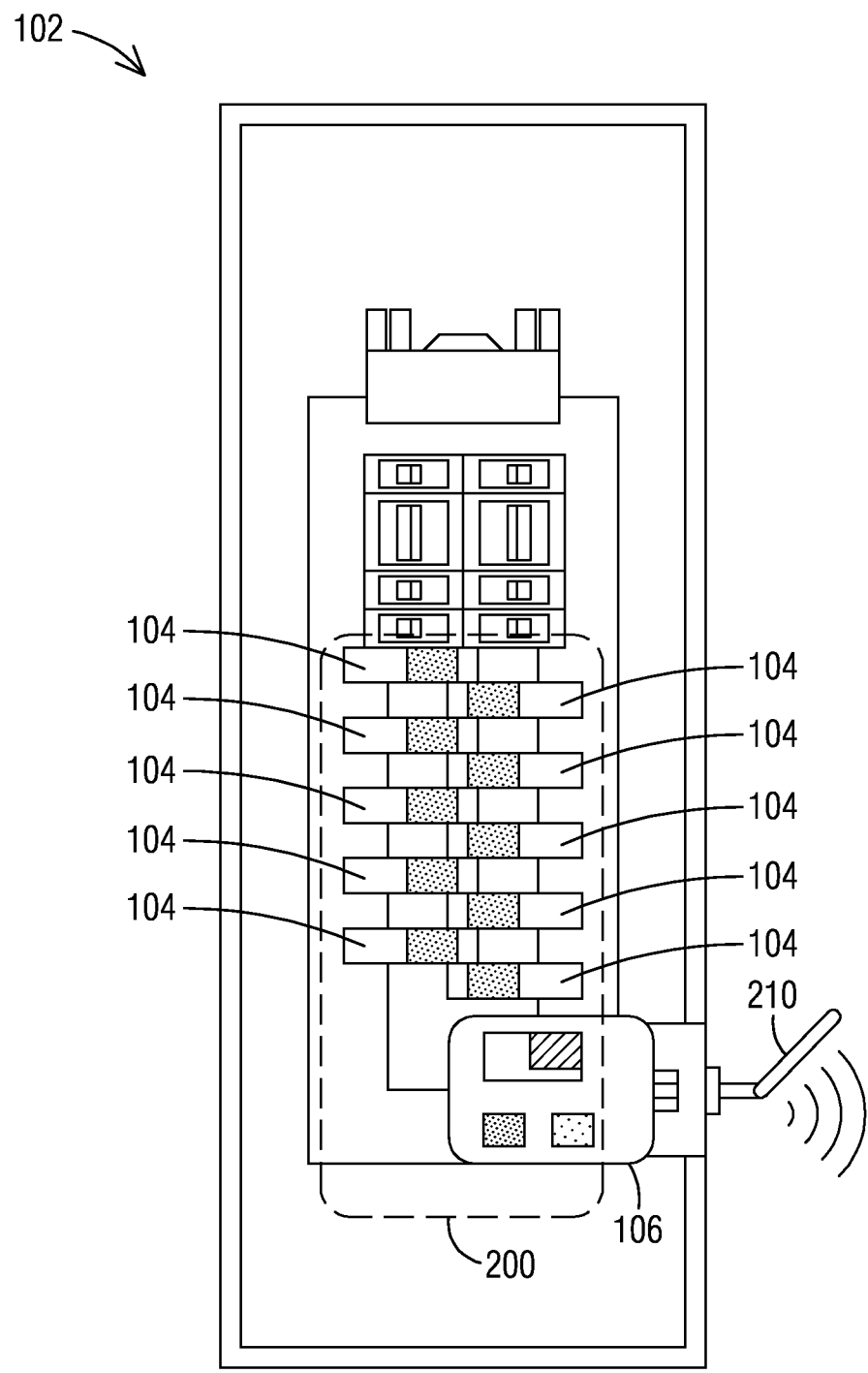
FIG. 2 is a front planar view of the residential power distribution panel of FIG. 1 in an example implementation.

Referring to FIG. 2, there is shown a front planar view of the residential power distribution panel 102 in an example implementation. In particular, the integration of the power distribution panel 102 with the residential communicating, solid state circuit breakers 104 and the residential energy management gateway 106 in the same location. The proximity of the gateway 106 with the circuit breakers 104 allows for the gateway to receive regular updates from circuit breakers. The internal panel communication network 200 located in the power distribution panel 102 includes the circuit breakers and the energy management gateway 106 as well as their wired or wireless intercommunication links. For some embodiments, the internal panel communication network 200 may also include an antenna 210 coupled to the energy management gateway 106 and positioned external to the power distribution panel 102 to facility wireless communications with other networks, such as the home network 112 and/or the cloud infrastructure 122 shown in FIG. 1.

Figure 3:
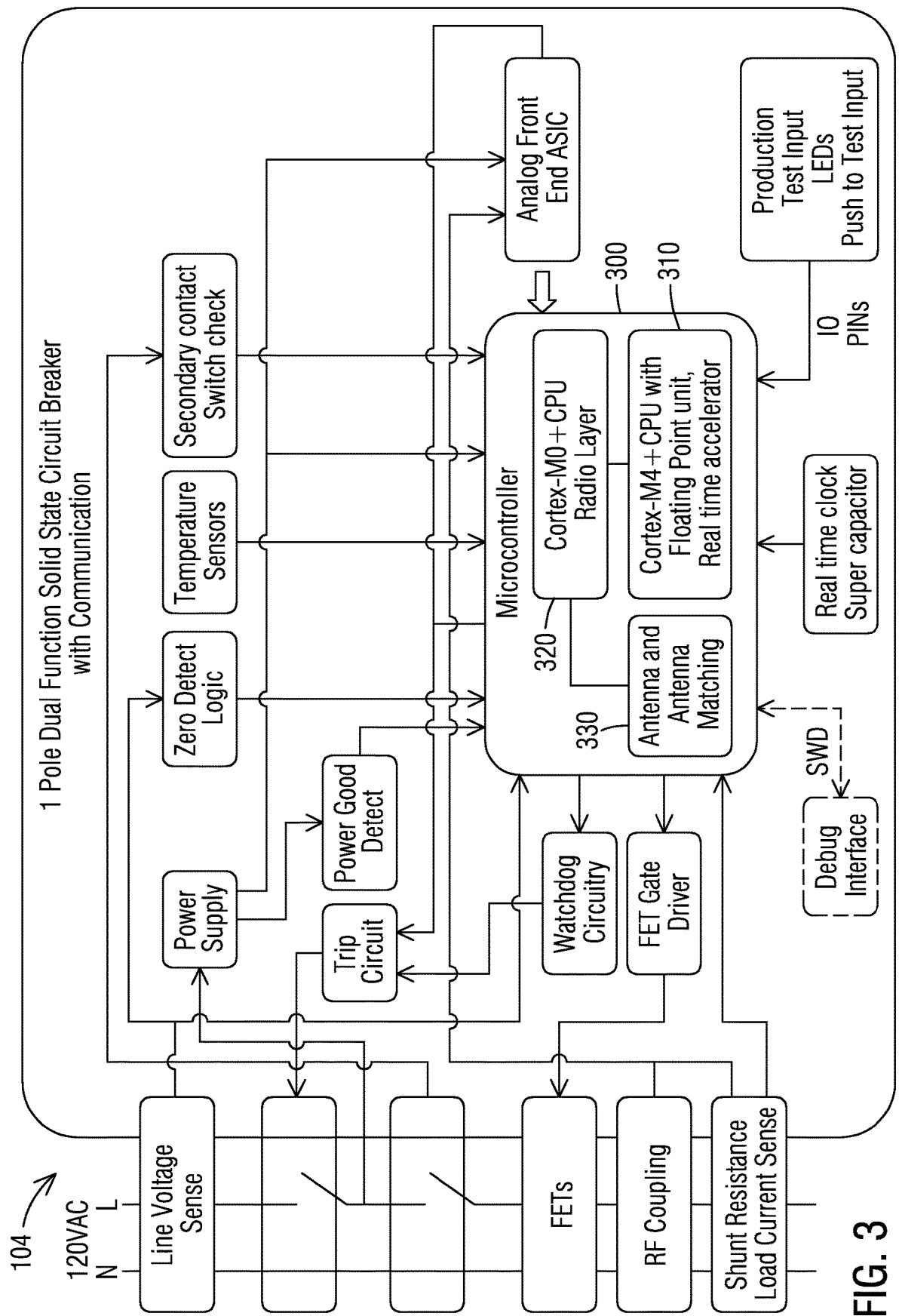
FIG. 3 is a block diagram of an example one of the circuit breakers of FIGS. 1 and 2 in an example implementation.

Referring to FIG. 3, there is shown is a block diagram of an example one of the circuit breakers 104 in an example implementation. Each circuit breaker 104 includes a microcontroller 300 for general operation of the electronic solid-state circuits as well as wireless communication. In particular, each circuit breaker 104 includes a processor module 310, a wireless module 320, and an antenna module 330. Each circuit breaker 104 also include supporting circuitry for general operation, such as power monitoring, power management, condition sensing, and watchdog/trip circuitry for interrupting current flow in response to overcurrent detection (among other things). For some embodiments, the main blocks of each circuit breaker 104 which would be feasible for 1 Pole Dual function solid state circuit breaker product with communication.

The communication may use the wireless module 320 using a software driven radio stack running on a co-processor which is integrated in a single module. Advantages of using the wireless module 320 include the capability of combining multiple wireless solutions. For example, the wireless module may include low energy wireless communication capabilities such as, but not limited to, the 2.4 GHz solutions with Bluetooth Low Energy, 802.15.4 protocols such as Zigbee, Thread, and other communication protocols. Another advantage of using the module 320 instead of a single microcontroller is the integrated solution, smaller footprint, and the reference design with on-board antenna and necessary matching circuitry. The module 320 is compliant with several industry standards such as FCC, CE, and other EMC regulations, which helps in bringing the solutions to the market seamlessly.

The connection of the energy management gateway 106 to the home network 112 allows the product to be accessible through a standard network, such as the World Wide Web.

Thus, the energy management gateway 106 allows the information to be hosted or queried on a cloud infrastructure at a periodic rate. The Utility or power provider may have an interest in knowing some specific details about the home owner's energy consumption in greater detail other than readings from a Utility meter which may not provide as granular information. The Utility vendor may be able to get a dashboard for individual home consumption and aggregate over a sub-division or community, as well as manage the expectations of the local grid for the stability needs of home owner and their community based on the historical consumption to prepare when bad weather is on its way. The utility vendor may also manage the expectations of the local grid when the information related to the consumption of the power through high demanding loads such as electric vehicles is available and further understand the home owner's/customer's usage of alternate power generation sources and the ability to sell back power to the grid and compensate/balance the local grid functionality accordingly.

The ability to host the information in a cloud infrastructure allows the user interface to be available on a web browser application or a mobile phone application. The user/customer/home owner can remotely monitor the information available through the cloud interface to either manage the power consumption, perform essential load management or remotely control the operations of the communication enabled circuit breakers through the gateway device. Alternately if the home owner is available within proximity of the residential panel and the home wireless network is not available, the mobile application can retrieve information through a wireless link, such as Bluetooth Low Energy protocol to perform the same features (such as the external device 118 shown in FIG. 1).

Figure 4:
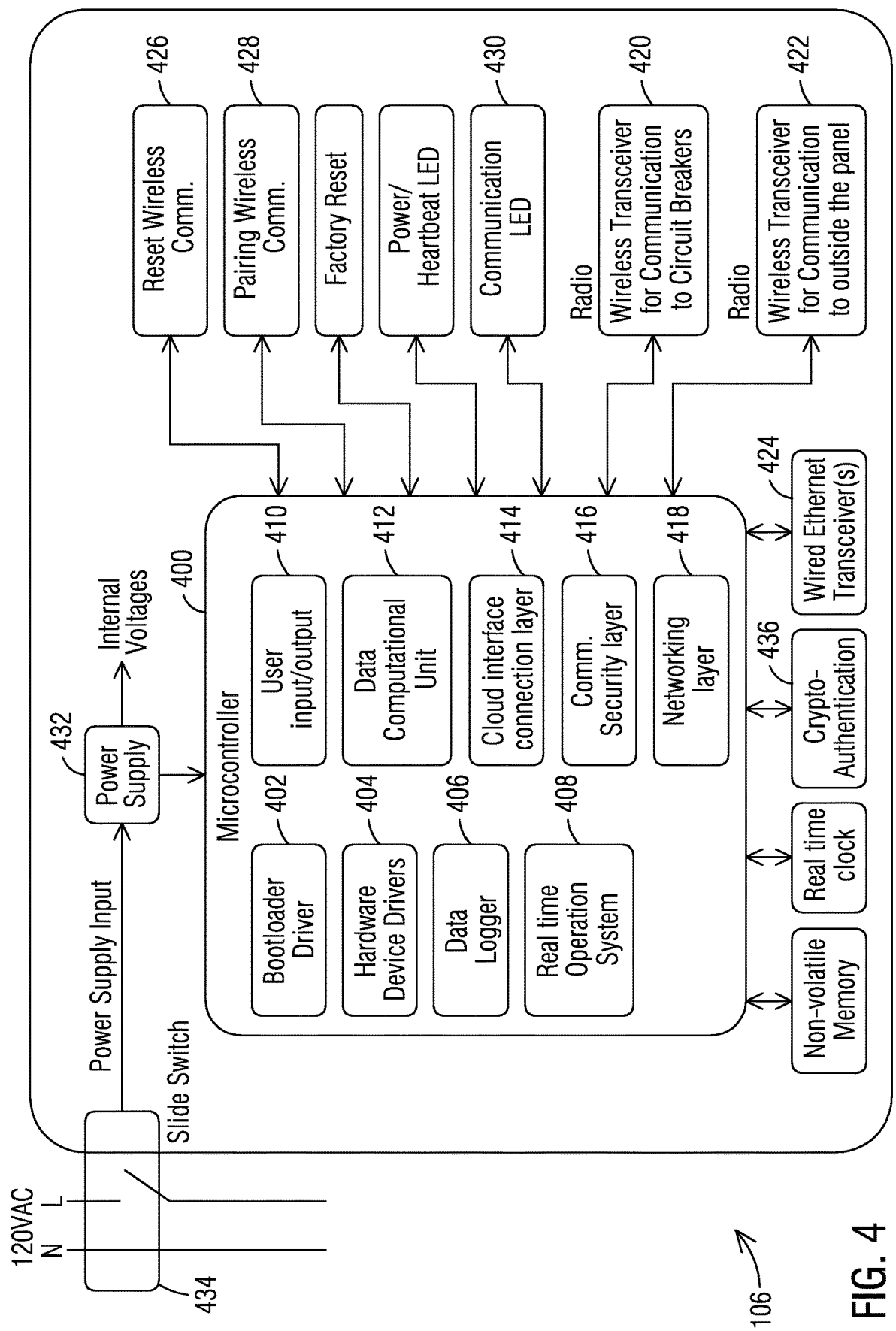
FIG. 4 is a block diagram of the energy management gateway of FIGS. 1 and 2 in an example implementation.

Referring to FIG. 4, there is shown a block diagram of the energy management gateway 106 in an example implementation. The energy management gateway 106 includes a microcontroller 400 for general operation of the gateway. The microcontroller 400 performs the application of aggregating and acting as support for the gateway capability. The energy management gateway 106 includes a bootloader module 402, a hardware device drivers module 404, a data logger module 406, a real time operating system module 408, a user input/output module 410, a data computational unit 412, a Cloud interface connection layer module 414, a communication security layer module 416, and a networking layer module 418. The energy management gateway 106 performs general operations power monitoring, power management, condition sensing, heartbeat signaling, and the like.

The energy management gateway 106 also includes wired and wireless communication circuitry. In particular, the energy management gateway 106 includes a first wireless transceiver 420, a second wireless transceiver 422, and/or a wired transceiver 424. The first wireless transceiver 420 provide communication to end devices of the internal panel communication network, including the circuit breakers 104 by the gateway 106. Examples of the communication protocols of the first wireless transceiver 420 include, but are not limited to, the Bluetooth Low Energy and 802.15.4 protocols such as Zigbee. The second wireless transceiver 422 provides communication to external devices outside of the power distribution panel 102, such as devices of the home network 112, the external network 116, and other external devices 118. Examples of communication protocols of the second wireless transceiver 422 include, but are not limited to, Bluetooth (including BLE), ultrawide band (UWB), Wi-Fi (including Wi-Fi Direct), Zigbee, cellular, mesh networks, PAN, WPAN, WAN, near-field communications, and other types of radio communications and their variants. For some embodiments, the wired transceiver 424 provides communication to the power source selection panel 110 and or the home network 112, such as the external source selector controller 108 of the power source selection panel or a router of the home network 112. Supporting circuitry for communications may also be included, such as a reset circuit 426, a pairing circuit 428, and a visual or audio indicator 430.

The energy management gateway 106 may include a power circuit 432 that receives external power and power information and provide internal power and power information to the internal circuitry. The power circuit 432 of the gateway 106 may be powered directly off the line side voltage input 434 and provide the necessary power to sustain the aggregation and gateway capability of the device. The power circuit 432 minimizes the need for an additional breaker or another step-down AC-DC regulator, instead be mounted in one or more slots where a single pole or two pole breaker may be mounted in a typical residential panel. This approach reduces the number of devices and wiring needed for the gateway device to be functional. In the case of plug-on neutral configuration, no wiring is needed to power the gateway device. Further, the physical mounting of the gateway device in a breaker slot allows the user to forego any worries about real estate issues inside the panel to mount the additional devices.

The wireless communication between the communication enabled circuit breakers 104 with the gateway 106 allows for the user to avoid worrying about wiring to individual circuit breakers or current transformers ("CTs") to receive current consumption information from each individual branches. Since the voltage information is directly available from being powered off the line side, the gateway 106 can calculate the power information by querying the current consumption wirelessly from the individual communication enabled circuit breakers 104.

For some embodiments, the energy management gateway 106 may further include an authorization/authentication circuit 436 to determining whether new end devices are authorized to join the internal panel communication network in response to detecting the new end device. If one or more new end devices are not authorized, then it or they are removed from the internal panel communication network.

Figure 5:
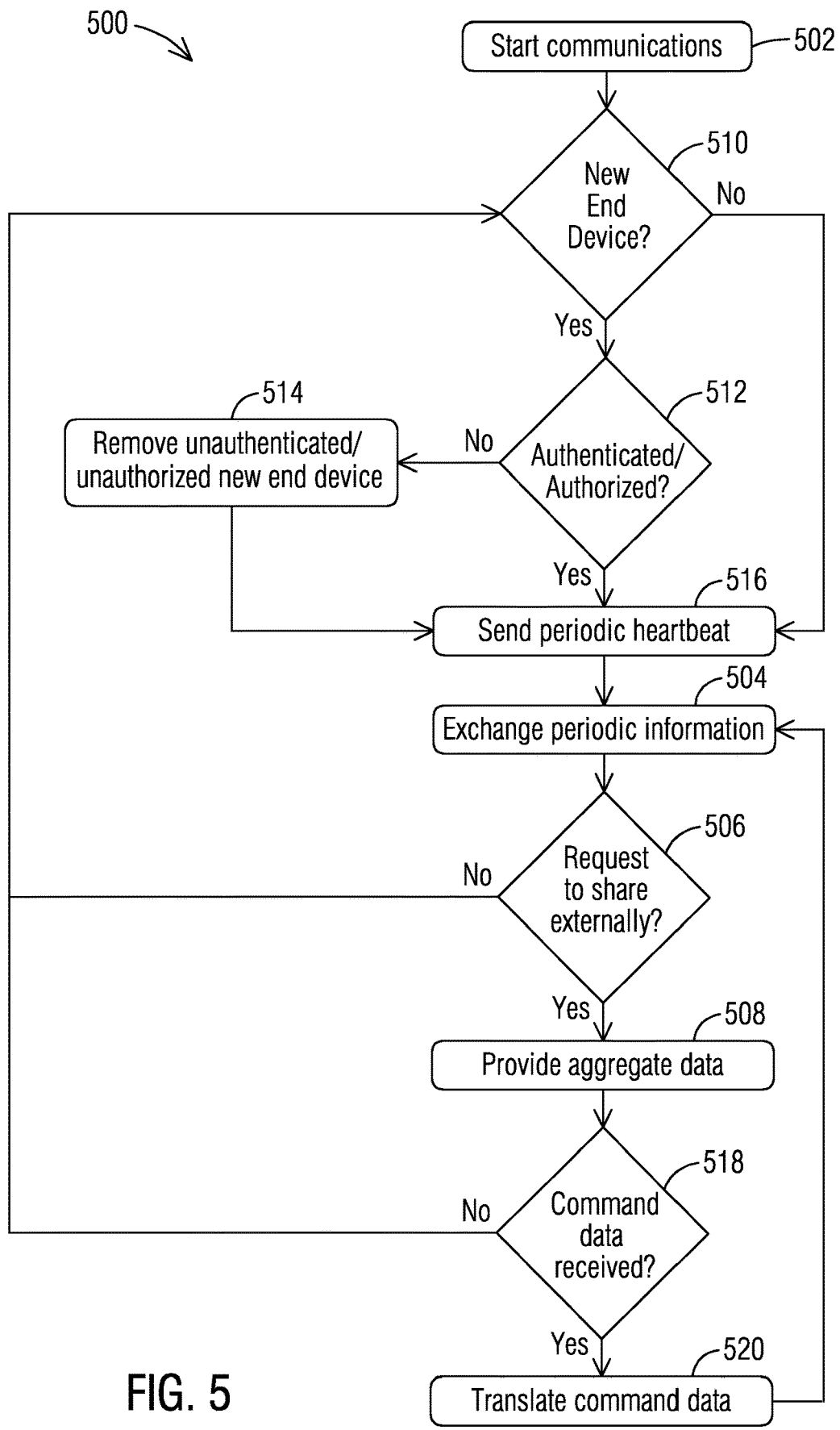
FIG. 5 is a flow diagram of an operation of the system for energy management of FIG. 1 in an example implementation that is operable to employ the techniques described herein.

Referring to FIG. 5, there is shown an example operation (500) of a system for energy management of a power distribution panel. The operation (500) is initiated (502) by establishing an internal panel communication network among circuit breakers located in the power distribution panel and activating communications within the network. The circuit breakers may be operative to interrupt current flow in response to overcurrent detection. An energy management gateway, which is also located in the power distribution panel, is operative to communicate with the circuit breakers to effectuate the communications among them. For some embodiments, the communications among the circuit breakers are wireless to avoid the installation and maintenance complications associated with wired connections. For some embodiments, the circuit breakers may retain power to allow wireless components to continue to transmit information even after one or more circuit breakers experience a trip condition and disengaged the load side.

For some embodiments, the internal panel communication network may be established during the initiating (502) operation by mounting the energy management gateway at a slot of the power distribution panel. Also, for some embodiments, the energy management gateway may be positioned in the power distribution panel via a plug-on neutral connection.

The energy management gateway exchanges (504) data of the circuit breakers subsequent to activating communications (502). The energy management gateway exchanges periodic information from all authenticated and authorized end devices in the internal panel communication network. The energy management gateway exchanges (504) the data. The energy management gateway may receive load current consumption information from the circuit breakers and determine power information of the power distribution panel. For some embodiments, the energy management gateway shares second data with a power source selector controller that monitors and controls sources of power to a residential facility. The energy management gateway determines the power information by determining the power information based at least in part on the second data. For example, as part of the exchange (504) of the data, the energy management gateway is powered directly off a line side voltage input of the power distribution panel and determines the power information of the power distribution panel based on the line side voltage input.

The energy management gateway provides (506, 508) the data of the circuit breakers directly or indirectly to an external device, such as a smart home device, in response to exchanging the data. The external device is part of a network, such as a smart home network, external to the internal panel communication network for controlling one or more external appliances. The energy management gateway may communicate wirelessly to the external device directly or via a home wireless network. For some embodiments, the energy management gateway detects (506) a request to share the data to the external device. The energy management gateway provides (508) the data to the external device in response to detecting the request to share the data to the external device. Thus, the energy management gateway provides aggregated data to a communication system external to the internal panel communication network if a request to share the information to the communication system is received.

The energy management gateway manages (510, 512, 514) end devices of the internal panel communication network, including the circuit breakers and the energy management gateway. For some embodiments, the energy management gateway detects (510) a new end device of the internal panel communication network and determines (512) whether the new end device is authorized to join the internal panel communication network in response to detecting the new end device. For example, the energy management gateway may determine whether the new end device has been authenticated to join the internal panel communication network. The energy management gateway may (514) remove any end device, including the new end device, from the internal panel communication network in response to determining that the end device(s) are not authorized (for example, not authenticated). Thus, an unauthenticated and/or unauthorized new end device is removed from the internal panel communication network if the new end device joins the network and is not authenticated and/or authorized.

For some embodiments, the energy management gateway may send (516) a heartbeat signal to end devices of the internal panel communication network. The heartbeat signal may be sent by the gateway on a periodic basis. For these embodiments, the energy management gateway may exchange the data of the circuit breakers in response to receiving the heartbeat signal.

The energy management gateway may receive (518) a command from the external device, such as a smart home device, in response to providing the data directly or indirectly to the external smart home device. The energy management gateway translates (520) the command to an end device, such as one or more circuit breakers, of the internal panel communication network. Examples of the command include, but are not limited to, tripping breaker, turning off load current, and changing breaker parameters. Tripping breaker includes opening the airgap. Turning off load current includes turning breakers into standby state in which the airgap stays closed but power electronics are turned off. Examples of the breaker parameters include, but are not limited to, rated current, trip current curves, trip current level adjustment ranges, rated voltage, and rated short-circuit breaking capacity.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A system for energy management of a power distribution panel comprising:
   a power distribution panel including a plurality of circuit breakers;
   an internal panel communication network located in the power distribution panel, the internal panel communication network being established among the plurality of circuit breakers; and
   an energy management gateway of the internal panel communication network located in the power distribution panel, the energy management gateway communicating with the plurality of circuit breakers, the energy management gateway sending a heartbeat signal to end devices of the internal panel communication network, exchanging data of the plurality of circuit breakers in response to receiving the heartbeat signal, and sending commands to control the plurality of circuit breakers, wherein the energy management gateway provides the data directly or indirectly to an external device, the external device being part of a network external to the internal panel communication network for controlling one or more appliances.

2. The system as described in claim 1, wherein the energy management gateway is mounted at one or more slots of the power distribution panel and is powered directly off a line side voltage input of the power distribution panel.

3. The system as described in claim 1, wherein the energy management gateway communication wirelessly to the external device directly or via a home wireless network.

4. The system as described in claim 1, wherein the energy management gateway shares second data with a power source selector controller that monitors and controls sources of power to a residential facility and determines power information based at least in part on the second data.

5. The system as described in claim 1, wherein the energy management gateway is positioned in the power distribution panel via a plug-on neutral connection.

6. The system as described in claim 1, wherein the energy management gateway detects a new end device of the internal panel communication network, determines whether the new end device is authorized to join the internal panel communication network in response to detecting the new end device, and removes the new end device from the internal panel communication network in response to determining that the new end device is not authorized.

7. The system as described in claim 1, wherein the energy management gateway detects a request to share the data to the external device and provides the data to the external device in response to detecting the request to share the data to the external device.

8. The system as described in claim 1, wherein the energy management gateway receives a command from the external device in response to providing the data directly or indirectly to the external device and translates the command to an end device of the internal panel communication network.

9. A method for energy management of a power distribution panel comprising:
   establishing an internal panel communication network among a plurality of circuit breakers located in the power distribution panel and an energy management gateway located in the power distribution panel to communicate with the plurality of circuit breakers;
   sending a heartbeat signal to end devices of the internal panel communication network;
   exchanging data of the plurality of circuit breakers by the energy management gateway in response to receiving the heartbeat signal;
   providing the data directly or indirectly to an external device by the energy management gateway, the external device being part of a network external to the internal panel communication network for controlling one or more appliances; and
   sending commands, by the energy management gateway, to control the plurality of circuit breakers.

10. The method as described in claim 9, wherein:
   establishing the internal panel communication network includes mounting the energy management gateway at one or more slots of the power distribution panel; and
   the energy management gateway is powered directly off a line side voltage input of the power distribution panel.

11. The method as described in claim 9, wherein the energy management gateway communication wirelessly to the external device directly or via a home wireless network.

12. The method as described in claim 9, further comprising sharing second data with a power source selector controller that monitors and controls sources of power to a residential facility, wherein determining power information by the energy management gateway includes determining the power information based at least in part on the second data.

13. The method as described in claim 9, wherein the energy management gateway is positioned in the power distribution panel via a plug-on neutral connection.

14. The method as described in claim 9, wherein:
   detecting a new end device of the internal panel communication network;
   determining whether the new end device is authorized to join the internal panel communication network in response to detecting the new end device; and
   removing the new end device from the internal panel communication network in response to determining that the new end device is not authorized.

15. The method as described in claim 9, further comprising detecting a request to share the data to the external device, wherein providing the data to the external device includes providing the data to the external device in response to detecting the request to share the data to the external device.

16. The method as described in claim 9, further comprising:
   receiving a command from the external device in response to providing the data directly or indirectly to the external device by the energy management gateway; and
   translating the command to an end device of the internal panel communication network by the energy management gateway.

17. A system for energy management of a power distribution panel comprising:
   a power distribution panel including a plurality of circuit breakers;
   an internal panel communication network located in the power distribution panel, the internal panel communication network being established among the plurality of circuit breakers; and
   an energy management gateway of the internal panel communication network mounted at one or more slots of the power distribution panel, the energy management gateway communicating with the plurality of circuit breakers, sending a heartbeat signal to end devices of the internal panel communication network, and exchanging data of the plurality of circuit breakers in response to receiving the heartbeat signal,
   wherein the energy management gateway provides the data directly or indirectly to an external device, the external device being part of a network external to the internal panel communication network for controlling one or more appliances.

18. The system as described in claim 17, wherein the energy management gateway is powered directly off a line side voltage input of the power distribution panel.

\* \* \* \* \*